US008850071B2

(12) United States Patent
Lindsay et al.

(10) Patent No.: US 8,850,071 B2
(45) Date of Patent: Sep. 30, 2014

(54) MAP INTUITION SYSTEM AND METHOD

(75) Inventors: Walter Hughes Lindsay, Phoenix, AZ (US); Joel Timothy Shellman, Camas, WA (US)

(73) Assignee: Liaison Technologies, Inc., Alpharetta, GA (US)

( * ) Notice: Subject to any disclaimer, the term of this patent is extended or adjusted under 35 U.S.C. 154(b) by 442 days.

(21) Appl. No.: 13/104,852

(22) Filed: May 10, 2011

(65) Prior Publication Data

US 2012/0023261 A1    Jan. 26, 2012

Related U.S. Application Data

(60) Provisional application No. 61/333,192, filed on May 10, 2010.

(51) Int. Cl.
*G06F 15/16* (2006.01)
*G06N 99/00* (2010.01)

(52) U.S. Cl.
CPC .................................. *G06N 99/005* (2013.01)
USPC ........................................................ 709/246

(58) Field of Classification Search
USPC .......................................... 709/224, 223, 246
See application file for complete search history.

(56) References Cited

U.S. PATENT DOCUMENTS

| | | | |
|---|---|---|---|
| 6,192,068 B1 * | 2/2001 | Fattouche et al. | 375/130 |
| 6,226,408 B1 * | 5/2001 | Sirosh | 382/224 |
| 7,599,944 B2 * | 10/2009 | Gaurav et al. | 1/1 |
| 7,904,304 B2 * | 3/2011 | Greenstein et al. | 705/1.1 |
| 8,015,139 B2 * | 9/2011 | Bahl et al. | 706/46 |
| 2002/0006163 A1 * | 1/2002 | Hibi et al. | 375/240.16 |
| 2003/0126138 A1 * | 7/2003 | Walker et al. | 707/100 |
| 2004/0139151 A1 * | 7/2004 | Flurry et al. | 709/203 |
| 2004/0181670 A1 * | 9/2004 | Thune et al. | 713/176 |
| 2007/0033221 A1 * | 2/2007 | Copperman et al. | 707/103 R |
| 2007/0061797 A1 * | 3/2007 | Atsatt et al. | 717/166 |
| 2008/0294624 A1 * | 11/2008 | Kanigsberg et al. | 707/5 |
| 2009/0089239 A1 * | 4/2009 | Herrera et al. | 706/59 |
| 2009/0234843 A1 * | 9/2009 | Ito | 707/5 |
| 2010/0293163 A1 * | 11/2010 | McLachlan et al. | 707/736 |
| 2010/0318511 A1 * | 12/2010 | Phan et al. | 707/722 |
| 2011/0071969 A1 * | 3/2011 | Doctor et al. | 706/15 |

\* cited by examiner

*Primary Examiner* — Jason Recek
(74) *Attorney, Agent, or Firm* — FisherBroyles, LLP; Anthony J. DoVale

(57) ABSTRACT

A map intuition system and method that involves machine learning techniques to analyze data sets and identify mappings and transformation rules as well as machine-human interactions to leverage human intuition and intelligence to rapidly complete a map.

4 Claims, 12 Drawing Sheets

FIG. 5

MAP INTUITION SYSTEM AND METHOD

CONTINUITY

This application claims the benefit of and priority to U.S. Provisional Application 61/333,192, titled MAP INTUITION SYSTEM AND METHOD, which was filed on May 10, 2010.

FIELD OF THE INVENTION

Presented herein is a map intuition system and method. More specifically, a method and system for intuitively creating data transformation is presented.

BACKGROUND OF THE INVENTION

Moving electronic data from one point to another in a computer network is ubiquitous. As data is moved, it often needs to be converted from one format to another. For instance, business partners may send EDI data to each other, and the back-end systems which receive and process the data use other data formats, necessitating that the data be transformed from the EDI format into XML, a COBOL Copybook, or some other format.

Multiple technologies such as XSLT and Java programs exist for performing data conversion. When a company needs or decides to change the data conversion technology, typically, the data conversion itself needs to be re-implemented. That is, the data formats for the input and output, and the mapping between the two, typically needs to be re-created and tested. This is often a time-consuming and expensive task.

Accordingly, there is a continuing need for improved transformation technologies.

SUMMARY

Presented herein is a Map Intuition System and Method that involves machine learning techniques to analyze data sets and identify mappings and transformation rules as well as machine-human interactions to leverage human intuition and intelligence to rapidly complete a map.

In one aspect, the system and method are based on an extending-the-human metaphor, as opposed to a replace-the-human metaphor. Thus, machine-human interactions form the basis of the system and method. One of the interactions is to trigger automatic analysis of data sets to identify mappings and rules. But the primary interactions begin once that automatic analysis of the data completes.

Other aspects and embodiments of the map intuition system and method are described herein. This description is meant to fully describe the map intuition system and method, but not limit its design, function, or application.

BRIEF DESCRIPTION OF THE DRAWINGS

These and other features of the preferred embodiments of the present invention will become more apparent in the detailed description in which reference is made to the appended drawings wherein:

Figure 5:
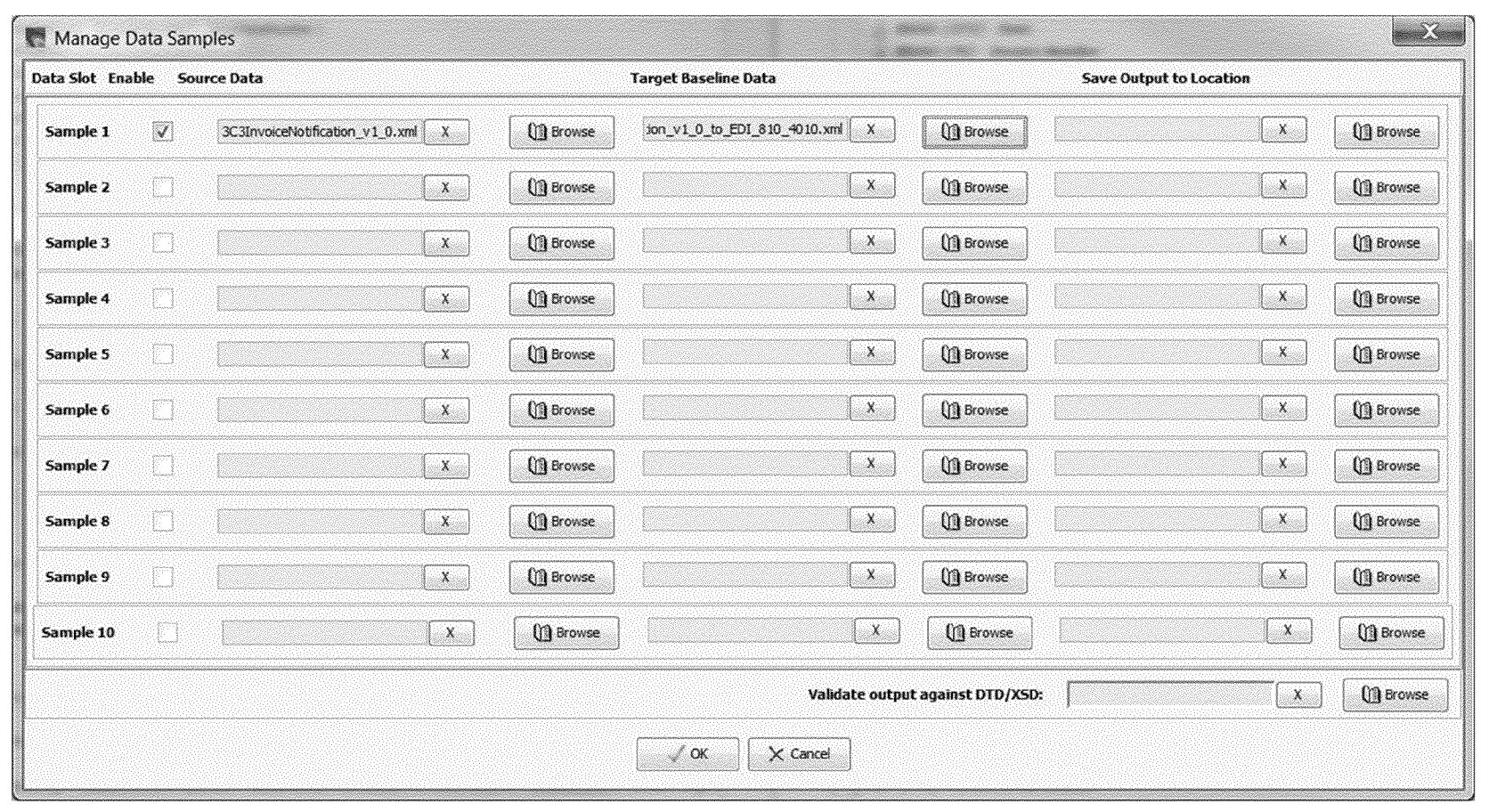

FIG. 5 is a graphical representation of a computer screenshot showing an example graphical user interface showing loading data samples into a map intuition system;

DETAILED DESCRIPTION OF THE INVENTION

Figure 1:
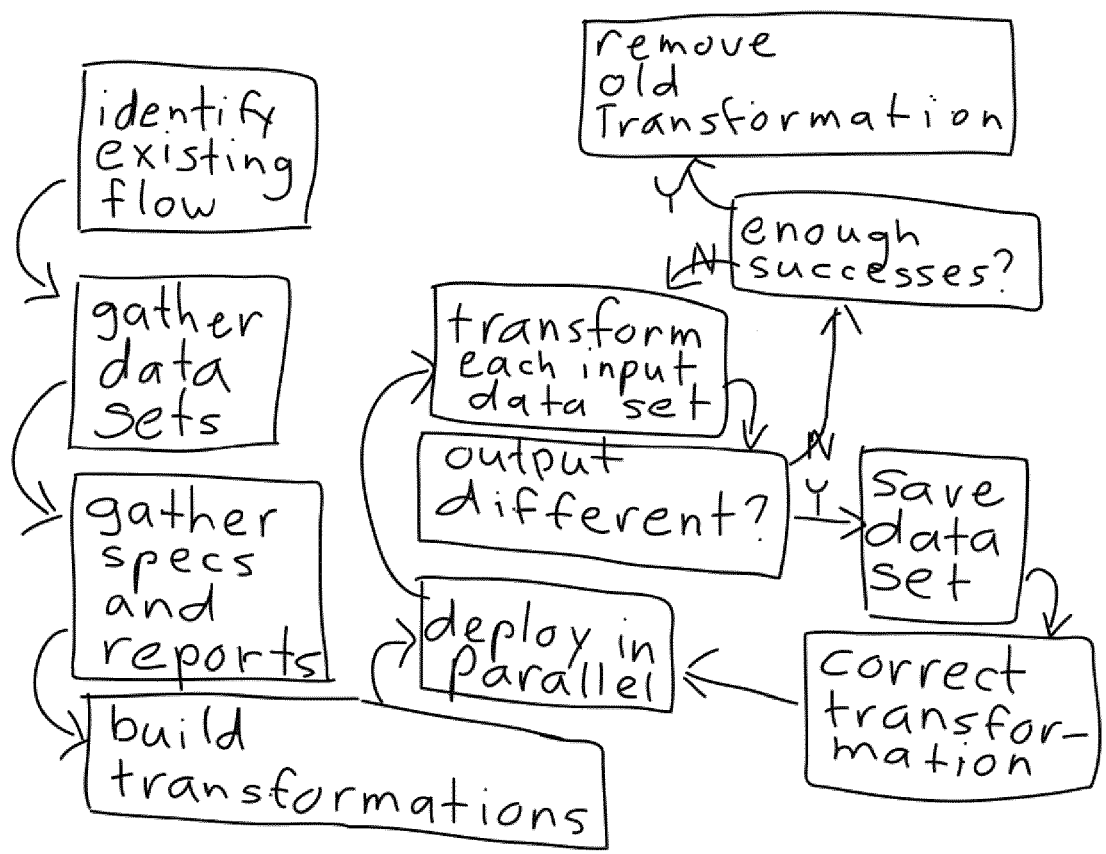
FIG. 1 is a exemplified flowchart of one example of a map intuition system and method.
Figure 2:
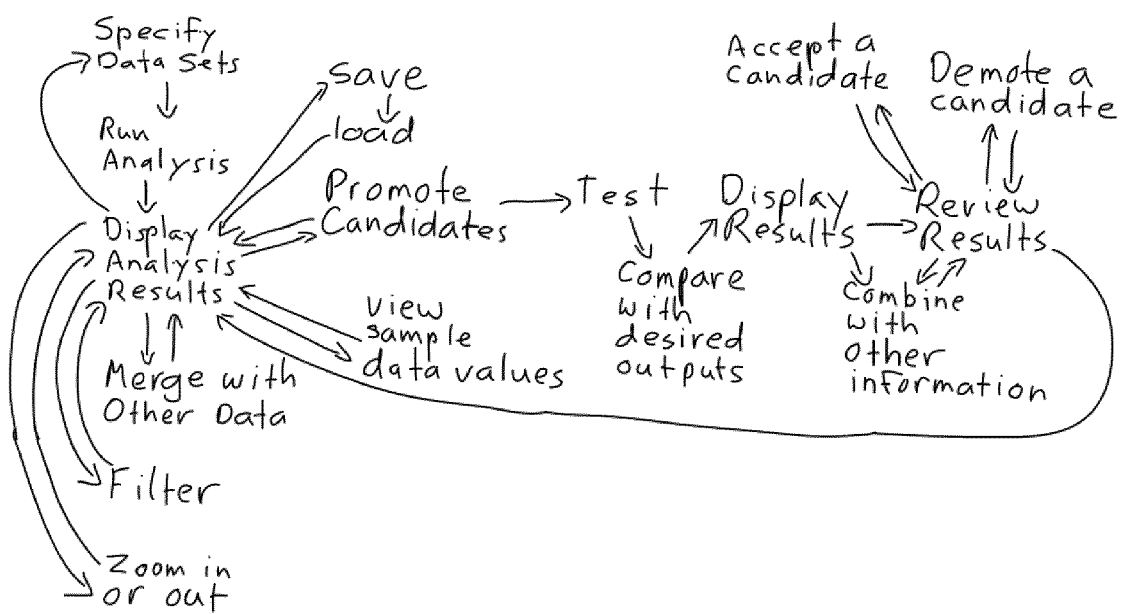
FIG. 2 is a exemplified flowchart of one example of a graphical user interface for a map intuition system and method.
Figure 3:
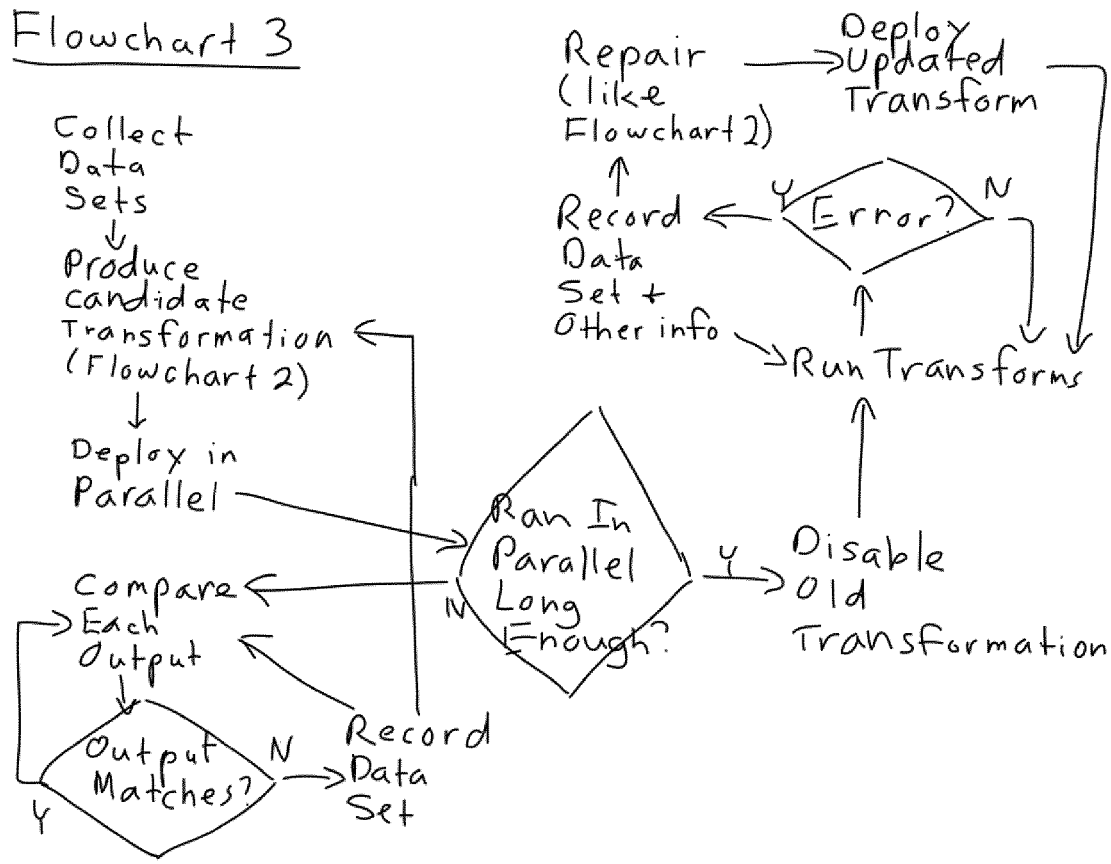
FIG. 3 is a exemplified flowchart of one example of a map intuition system and method.
Figure 4:
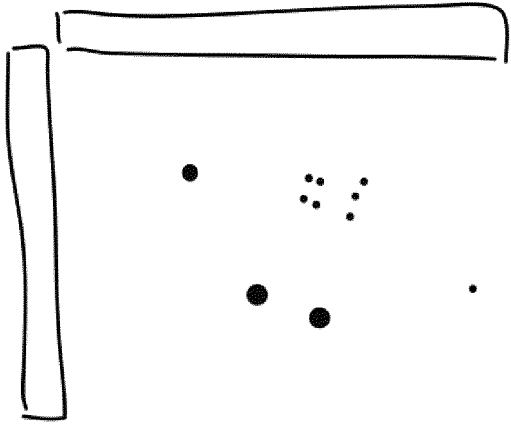
FIG. 4 is a graphical representation of a sample heat map for a map intuition system.
Figure 4:
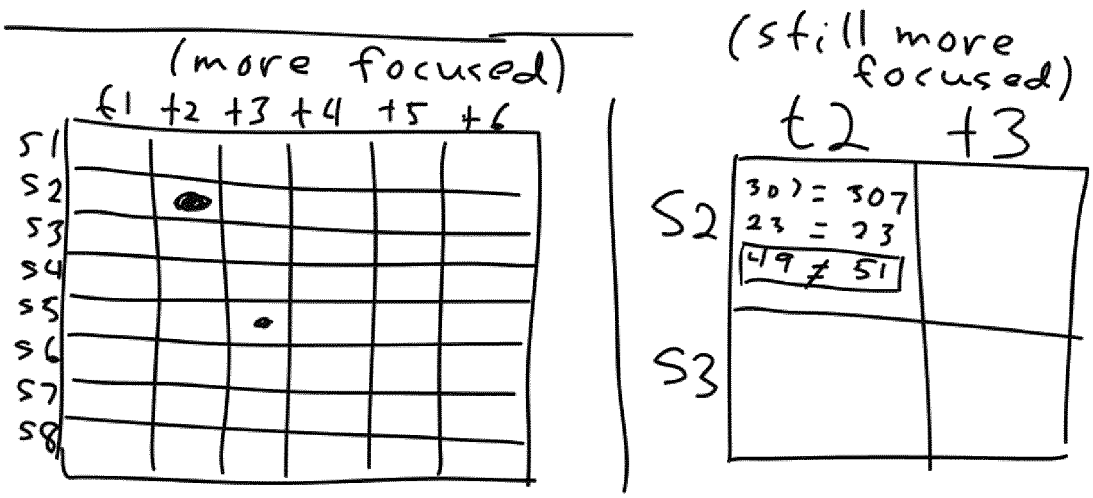
Figure 6:
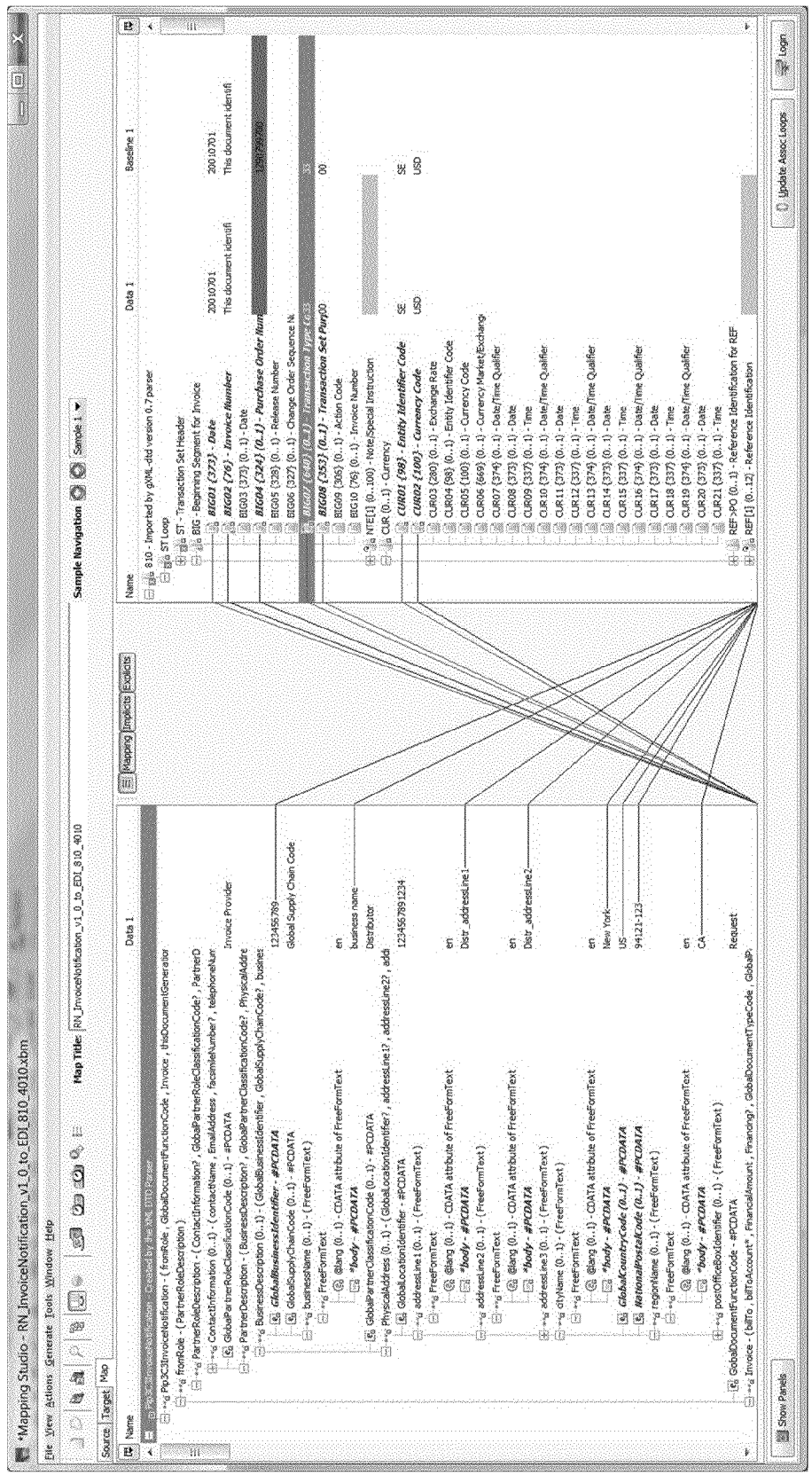
FIG. 6 is a graphical representation of a computer screenshot showing an example graphical user interface showing mapping relationships between source data format definitions and target data format definitions.
Figure 7:
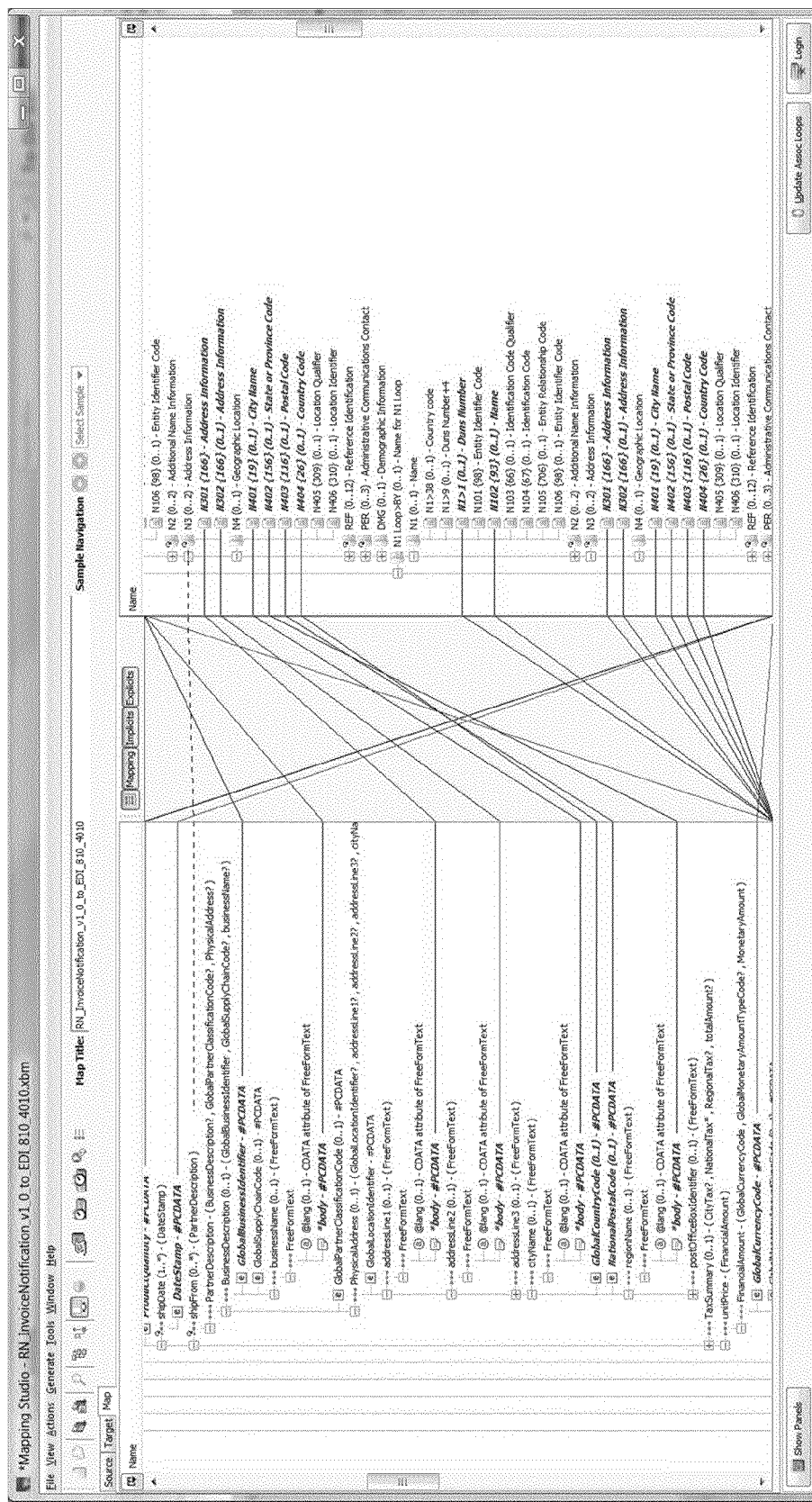
FIG. 7 is a graphical representation of a computer screenshot showing an example graphical user interface showing a map with field and group constructs being related between source and target.
Figure 8:
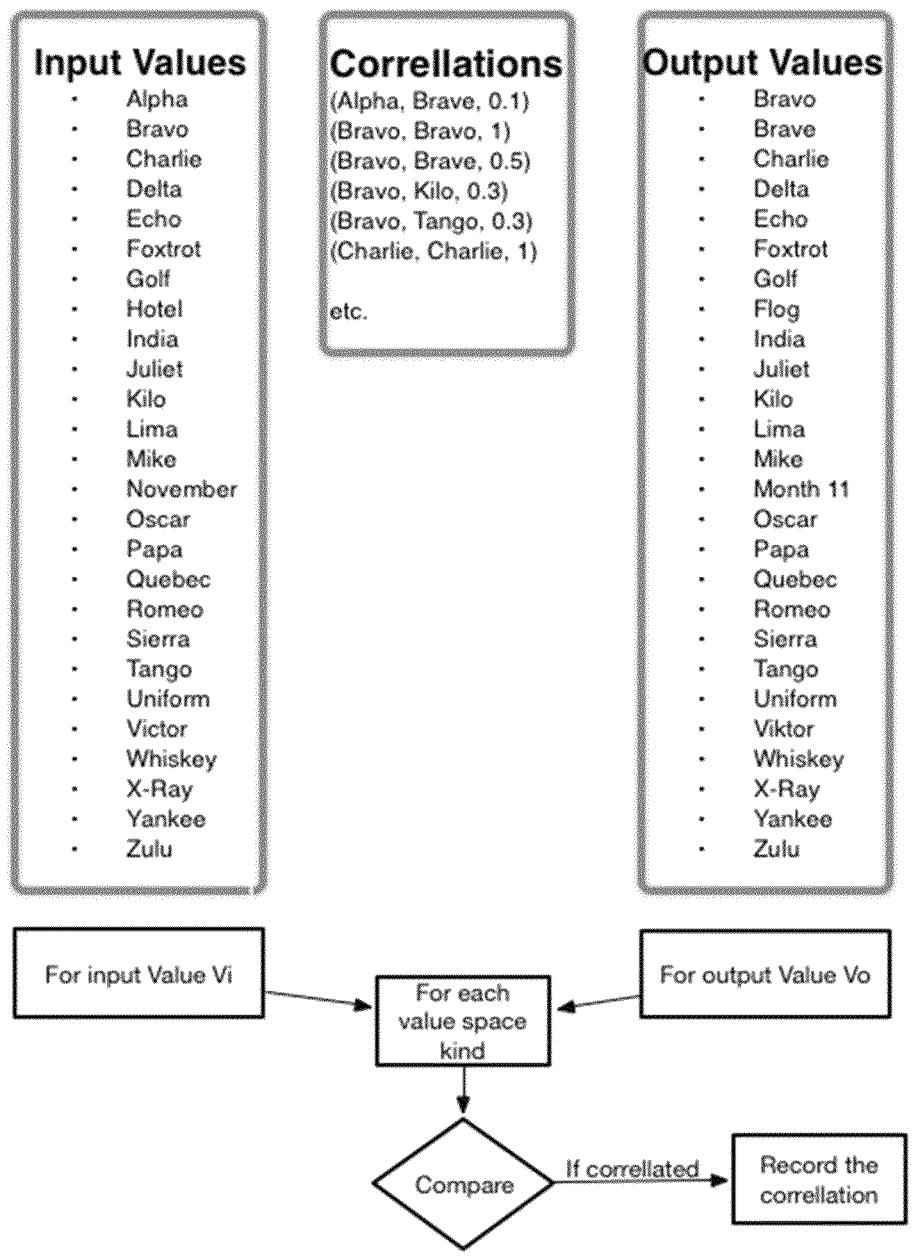
FIG. 8 is an exemplified flowchart of an inference engine for use in a map intuition system, illustrating the system comparing input and output values of input data samples with an output data sample.
Figure 9:
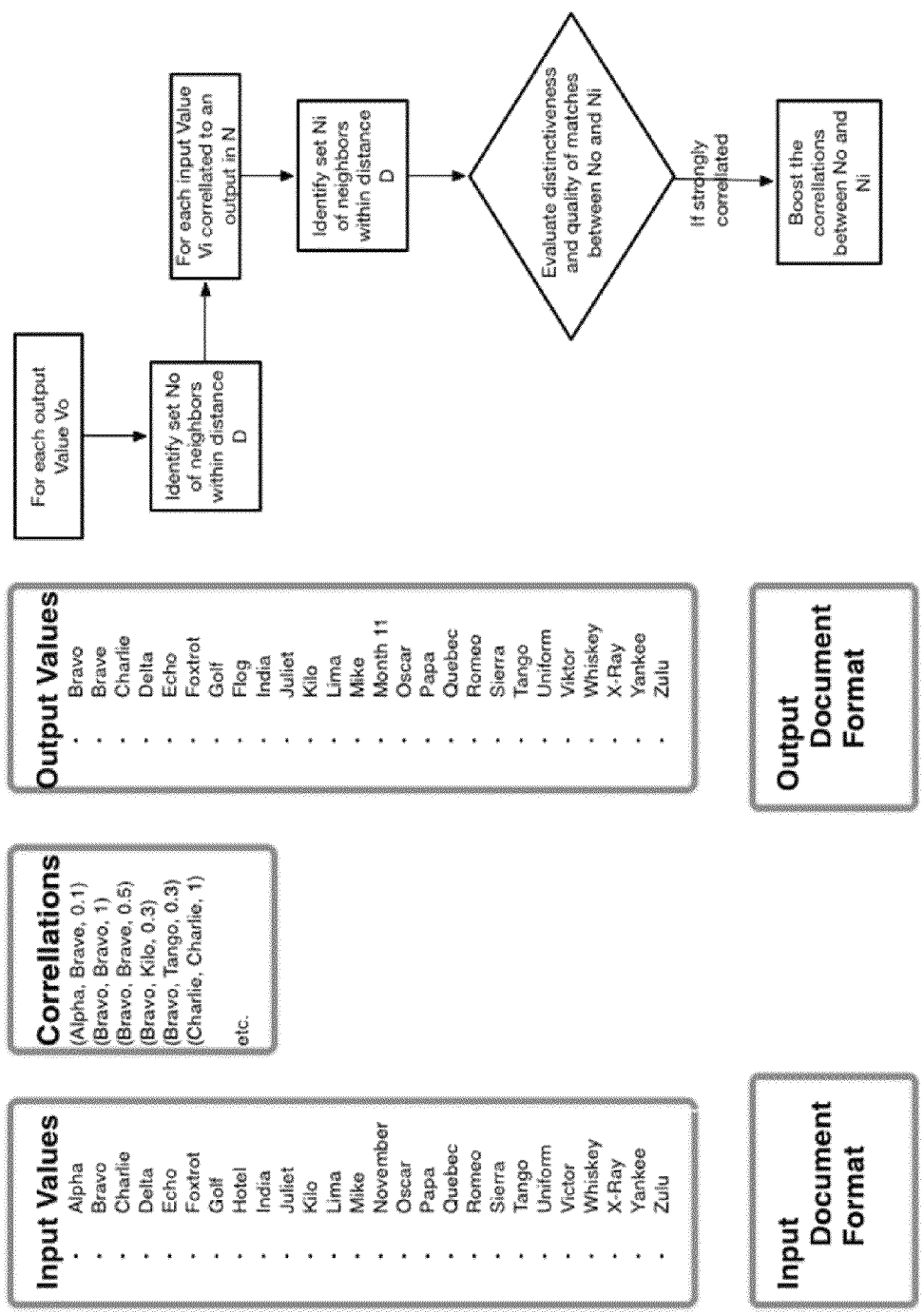
FIG. 9 is an exemplified flowchart of an inference engine for use in a map intuition system, illustrating the system identifying the strength of correspondences in values from one region of an input data sample with a region of an output data sample.
Figure 10:
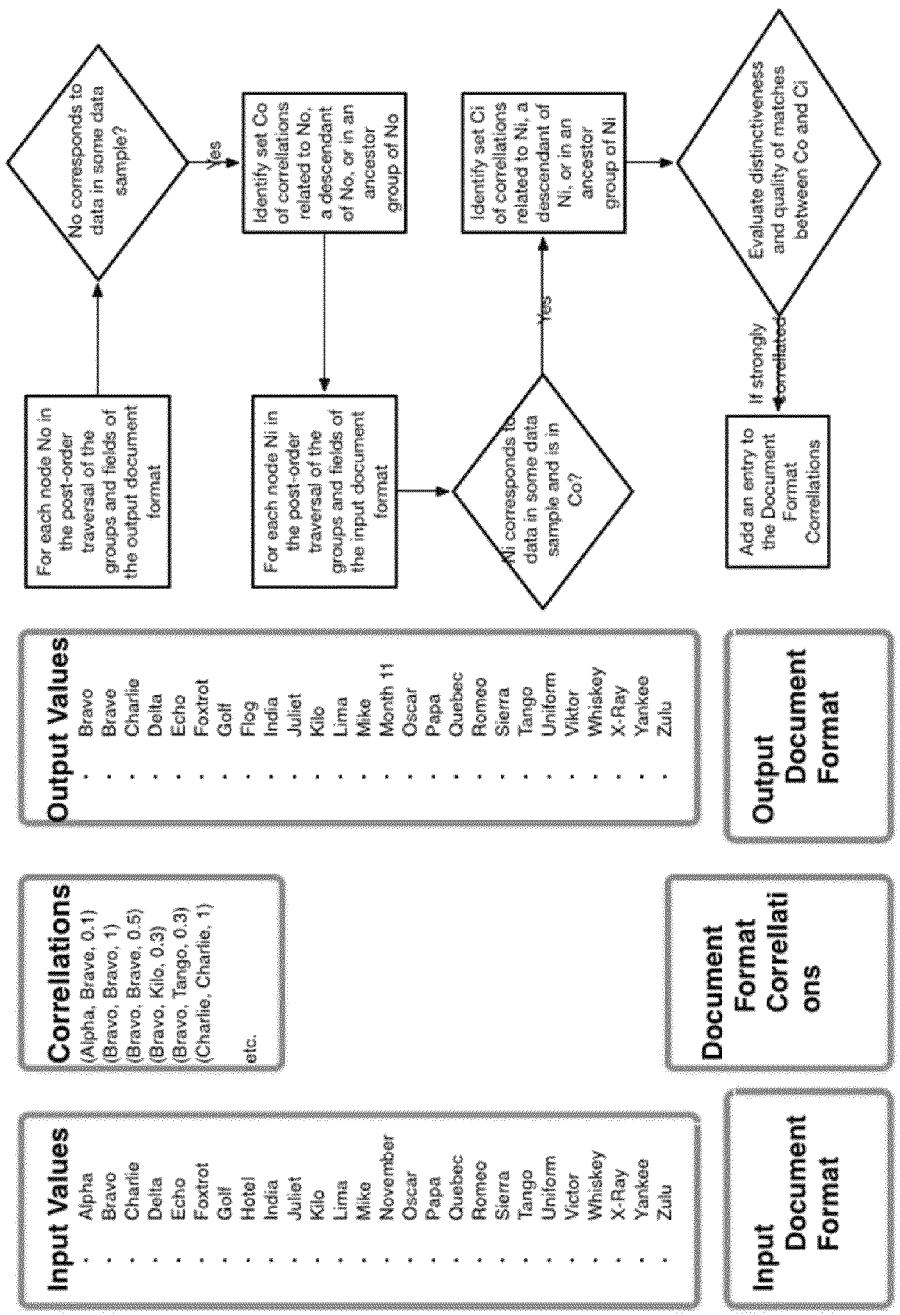
FIG. 10 is an exemplified flowchart of an inference engine for use in a map intuition system, illustrating the system using inference engine information from individual data samples to identify relationships between the input and output data format definitions.
Figure 11:
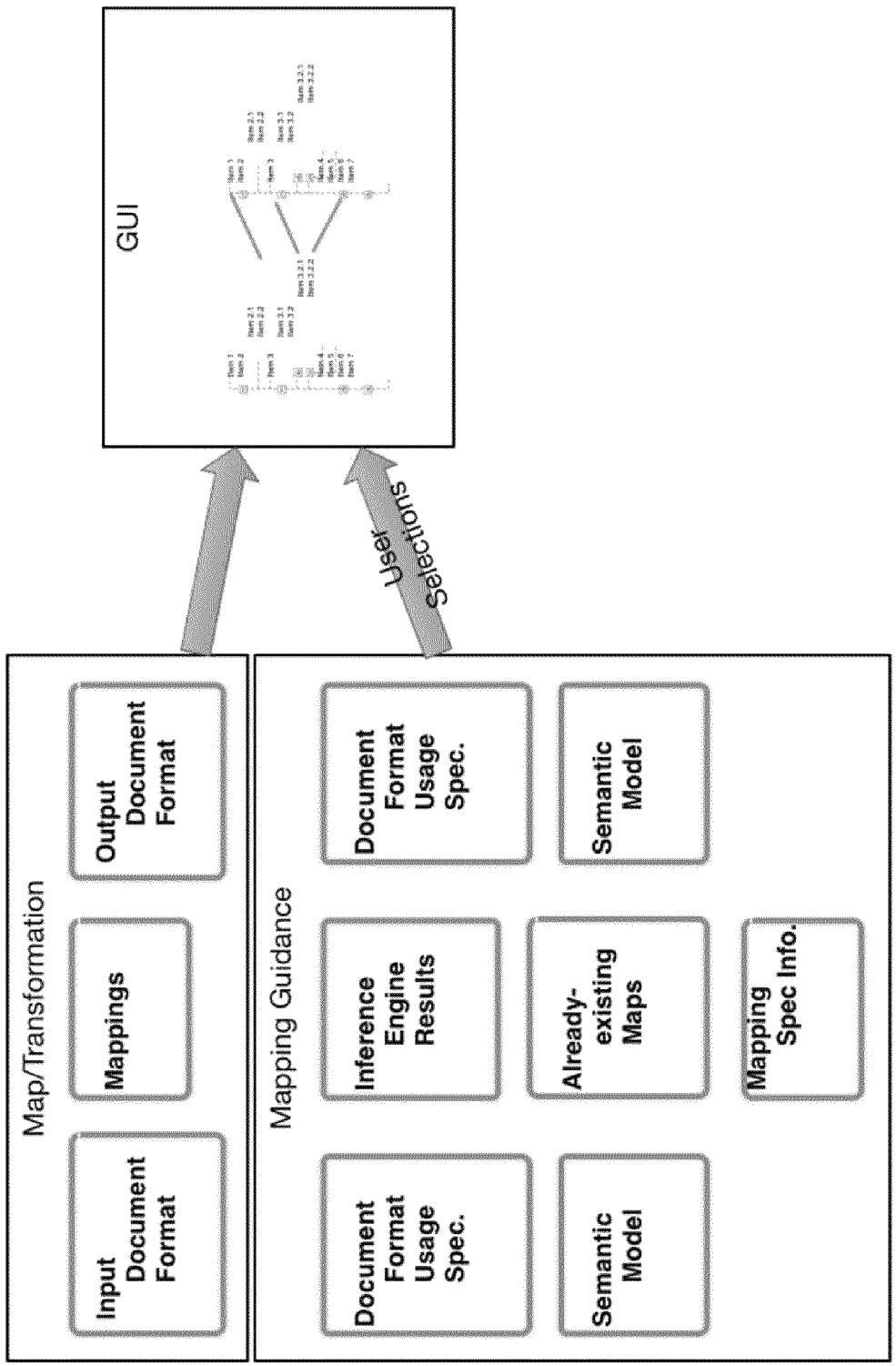
FIG. 11 is a graphical representation of one aspect of a GUI for a map intuition system that uses inference engine information to focus a user's attention and organize the user's work based on a variety of information.
Figure 12:
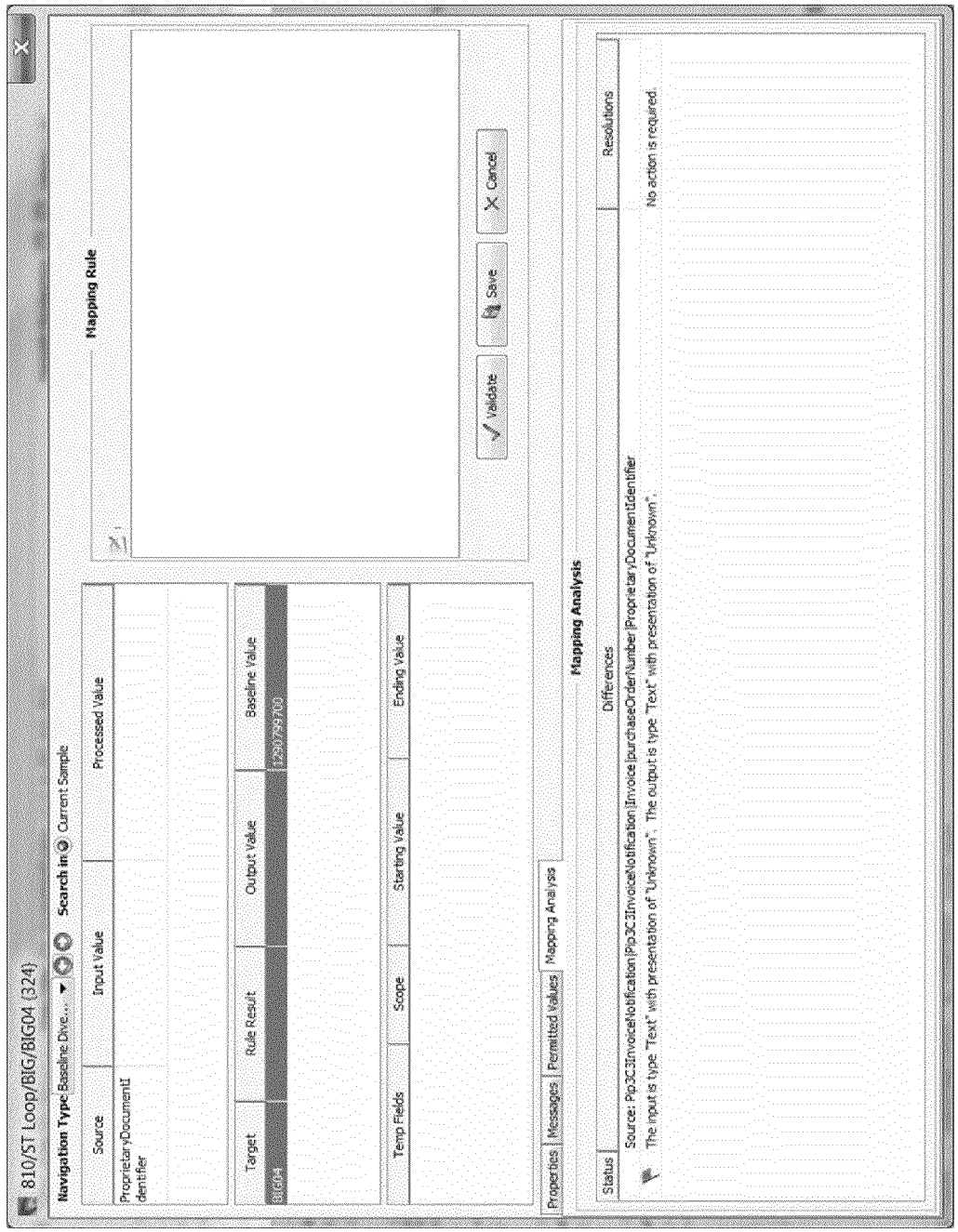
FIG. 12 is a graphical representation of a computer screenshot showing an example graphical user interface for allowing a user to examine and complete the logic needed to convert data from the input data format definition to the output data format definition.

The present systems and apparatuses and methods are understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a data set" can include two or more such data sets unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Presented herein is a map intuition system and method that involves machine learning techniques to analyze data sets and identify mappings and transformation rules as well as machine-human interactions to leverage human intuition and intelligence to rapidly complete a map.

In one aspect, the system and method are based on an extending-the-human metaphor, as opposed to a replace-the-human metaphor. Thus, machine-human interactions form the basis of the system and method. One of the interactions is to trigger automatic analysis of data sets to identify mappings and rules. But the primary interactions begin once that automatic analysis of data completes.

In one exemplified aspect, the method comprises at least one data flow involving a data transformation M1. The data inputs can come from a variety of sources and the data outputs can be sent to a variety of destinations. The data flow can move different kinds of data and initiate a plurality of transformations. In one aspect, the data flow comprises a plurality of data flows within a network.

The method comprises capturing one or more inputs feeding into the data transformation M1 and the corresponding output for each input. As one skilled in the art can appreciate, an input can be one or more files. In another aspect, the method comprises using user interface to define the data format of the captured samples, both input and output.

In another exemplified aspect, the captured samples are then fed into an inference engine, which produces candidate transformation information. The user then reviews the candidate transformation information to complete the definition of the transformation M2 which generates the same output as does the transformation M1 from the original data flow. This process can be repeated for additional data samples. Once definition of the transformation M2 is complete, the user can save the definition and can also deploy it into a new data flow.

In one aspect, a graphical user interface ("GUI") is provided for the user to review the candidate transformation information and complete the definition of the transformation. In another aspect, the steps the user takes are the following: 1) specifying the selection criteria for the candidates; 2) selecting items from the filtered list; 3) promoting the selected items to be part of the definition of the transformation; 4) running a test to identify the success of the definition of the transformation; 5) de-selecting or modifying parts of the definition of the transformation, after which the user can return to step 4, if necessary; and 6) returning to step 1 until the user is substantially satisfied. The system takes advantage of previously-known information about data format definitions, including previous transformations involving the input or output data format definition, as well as other information, to aid a user in completion of the transformation when the inference engine could not identify any helpful correlation between the input and the output. For example and not meant to be limiting, if a lookup from an external table is needed to convert values from one scheme to another (e.g. to convert between UPC codes and a vendor's part numbers), the inference engine will not detect a correlation. However, there is a correlation, and by having multiple kinds of information available, the user can identify patterns the inference engine could not identify. Using the GUI to display the patterns from which to choose, helps the user complete the transformation definition.

In one aspect, the GUI comprises a "heat map." This heat map can display the entire source data format definition(s) on one axis and the target data format definition(s) on another axis. Displaying recursive or large interfaces in a manageable form as an axis may require pruning irrelevant data, or otherwise restricting the amount of the data format definition represented on the axis at one time. In one exemplified aspect, the heat map can color or otherwise highlight the intersection between source and target definitions, visually highlighting the goodness-of-fit data returned from automatic data analysis. This allows the human eye to rapidly identify patterns in the candidate mappings. For example and not meant to be limiting, if a source data format is mapped to an almost identical target data format, the automatic analysis might generate a diagonal line in the heat map (other information might also display, but in most cases the human eye an identify such a line amidst the noise of other candidate mapping information).

Candidate mappings that strongly correspond with the majority of the data sets can appear more visually prominently in the heat map than weaker candidate mappings. For instance, by varying the brightness of portions of the map, the strength of candidate mappings can be made clear. In other situations, such as for color blind individuals, a threshold can be specified, and all candidates which are sufficiently strong (or weak) can be displayed while other candidates are hidden. Other mechanisms can also be used to filter out unwanted information to allow the human to more rapidly comprehend or interact with the information in the heat map.

The data from the automatic data analysis (e.g. candidate mappings and transformation rules) can be combined with additional information in the same heat map, or displayed alongside the heat map for other data. For instance, if a mapping specification (which might not reflect the actual Transformation in use in the data flow) is available and is loaded or entered into the system, that information can be displayed in one color in the heat map, the information from automatic data analysis in another color, and the overlap could appear as a combination of the two colors. Of course, it is contemplated that other methods of highlighting can be employed other than color.

In addition, one or both axes of a heat map can be based on actual sample data (such as an aggregate of multiple data samples overlaid on the same axis) instead of being based on the data format. For instance, if a message format is very large or is recursive, but the message size in the data flow is more moderate, this would allow the heat map to be more manageable.

In addition to the heat map metaphor, the source data format can be represented on the left of the screen and the target on the right, and lines or other techniques can be used to display the mapping information. Data mapping tools today often use a tree metaphor for the data format display.

In such a display, the results of automatic data set analysis can also be displayed as mapping lines or via other visual techniques between the source and target data formats. As with heat maps, an aggregate representation of data samples for the source or target can be used. The candidate mapping and rules and other information from the automatic data set analysis can be combined with other data, as with heat maps.

The results of automatic data set analysis can also be displayed as a list. Displaying the information as a list can simplify a bottom-up approach of looking at each piece of information individually, accepting or rejecting the candidate, and then proceeding to the next piece of information. The user can sort the list, and the list of candidates can be filtered and prioritized with assistance from other sources of data. In addition, the divergences between the output of a transform and the expected output can be handled as a list. As can be appreciated, one advantage of a list is that the user gets a sense of how much work is left to do.

As discussed herein above, the map completion GUI is a computer user interface for allowing humans to interact with source and target data formats, the results of automatic data set analysis, and other information such as mapping specification data, and to produce a working set of mapping and transformation rules.

Using the heat map approach, for instance, a user can select a region of the heat map and expand it, allowing more detail about that region of the heat map to appear since that region of the heat map appears larger on the screen (i.e. "zoom in"). At sufficient magnification, details of the source or target data and/or data format appear, details of candidate mapping or transformation rules, etc. appear as text or graphically. In zooming back out, the level of detail reduces. A user might also focus on data by selection portions of the source or target data format or data samples and filtering out other portions.

A user can pick portions of the heat map (e.g. select a region or a single intersection or a set of intersections), and perform operations on those portions. For instance, a user might promote candidate mappings or transformation rules to be hypothesis mappings or transformation rules and run a test based on the available input data samples to see if those mappings and transformation rules produce the desired outputs. Information about data sets for which the mappings do or do not produce the desired outputs can be displayed as details in the heat map. Hypothesis mappings can be promoted to accepted mappings, or demoted back to candidate mappings.

In addition, a user can navigate from the heat map to other portions or representations of the overall GUI. For instance, a user could navigate from a portion of a heat map or the axes of a heat map to the relevant portion of the display with the source on the left and the target on the right with optional mapping lines.

In another aspect, the heat map can be used to display additional details in another display. For instance, a user could display all field values corresponding to a field in the source or target data format. In yet another aspect, the results of testing operations can also be merged with other data of a heat map. For instance, mapping information (e.g. candidate, promoted, etc.) and the success or failure of a test could be overlaid so the human can see what regions of the map are not producing the desired output, and in many cases could at a glance identify alternative mappings which might better produce the desired results, or might identify transformation logic which could help produce the desired output.

The results of different stages of the same information can also be compared in a heat map. For instance, the information of two or more different test runs could be merged or contrasted. The definitions of two or more versions of a transformation, or of different but similar transformations, could be simultaneously displayed or contrasted.

Similarly, visual displays with the source data format or data on the left and target data format or data on the right can make apparent details which might be obscured in a heat map. For instance, to compare in detail the results of a test run, such a display allows the human to see the output of a test and compare it with the desired output, and to see it in a form closer to the actual syntax of the data than is possible with a heat map.

In these and similar visual metaphors, the end goal is to produce a Transformation which generates substantially the same outputs as an existing data flow, or which produces the outputs which have been designed as test cases for creating a new Transformation from sample data.

As discussed herein above, data samples that are captured are fed into an inference engine, which produces candidate transformation information. In one aspect, the inference engine identifies value spaces relevant to the field data type and value in the field for each input and output field value in the data set, and represents the value in those value spaces.

In one aspect, the inference engine first completes a field to field comparison and ranking. This is completed by comparing each input field value with each output field value, and identifying the degree of correspondence between that pair. The degree of correspondence can be represented numerically. In another aspect, this comparison and identification of degree is calculated by determining one or more of the following: 1) whether the output field is equivalent to the input field value; 2) whether the output field value is a subset of the input field value; 3) whether the output field value is able to be partially constructed from the input field value; and 4) how much of the output can be constructed.

The inference engine can then cluster the source and target field matches. For example, for each output field value Vo in the data set, the engine will identify the set No of other output field values within some "distance" D in the document from Vo. Then, for the items in No, it identifies the set S of input items related to No. For each item Vs in S, it then identifies the set Ni of the other input field values within some "distance" in the document from Vs. In one aspect, the inference engine will then rank the size, quality of match, and distinctiveness of the matches of the sets Ni compared to Ni and No, and if a threshold is passed for some Ni, it will increase the ranking of the degree of correspondence between items in Ni to items in No.

The inference engine, in one aspect, will also merge the rankings from the data level to the data definition level. For the target and source data definitions which describes the data in the data sets, the inference engine will first examine the target data format definition and perform the following steps for each group or field node No in the target data definition which has matching data in at least one of the data sets. In one aspect, the inference engine examines the target data format definition by performing a post-order traversal. Then, the inference engine will identify the set Co of correlations directly involving No, all descendants in the data format definition of No, or all descendants Do of an ancestor of No (such that Do can be reached from an ancestor without passing through a path step with maximum cardinality greater than 1). In one aspect, the inference engine will then perform a post-order traversal of the source data format definition and perform the following steps for each group or field node Ni in the source data definition which appears in Co. Then, the inference engine will identify the set Ci of correlations directly involving Ni, all descendants in the data format definition of Ni, or all descendants Di of an ancestor of Ni (such that Di can be reached from an ancestor without passing through a path step with maximum cardinality greater than 1). Then, the inference engine evaluates the distinctiveness and quality of matches between Co and Ci, and if strongly correlated, a numerical rating is identified for the correlation and the correlation and its rating are recorded as part of the output of the inference engine.

It is contemplated that, at times, the relationship for field values in input and output data samples may not be apparent to the inference engine. As such, the user of the map intuition system needs to substantially replicate the previous behavior without the assistance of the inference engine. In this aspect, the map intuition system can make use of locality. For instance, if the input and output data format are organized according to similar principles, and the input field or group Vi is related to output field or group Vo, then, it stands that neighbors of Vi will more likely be related to neighbors of Vo. The GUI will allow the user to focus on the nearby relations of a target for which the inference engine has not identified a mapping relationship.

In this aspect, the map intuition system can also make use of previous uses of the source and target. For instance, if the data format has been previously mapped, the mechanisms used to populate the missing output field may be similar to the mechanisms uses in previous mappings (transformations). The map intuition system will let the user rapidly search previous mappings of the data format.

Additionally, the map intuition system can comprise a library of common functions. In this aspect, the map intuition system will allow users to register conversion functions, and will allow the user to ask the system to search among the conversion functions for one which will convert from the input to the output. For example, if the input value needs to be looked up in a conversion table, and the output value can be read from the conversion table, the system will identify use of the conversion table as a candidate. In one aspect, the user can trigger this search while evaluating the results of the inference engine.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

We claim:

1. An inference engine method for ranking and highlighting candidates in a map intuition system, comprising:
   receiving at a processor a source data set having data with input field values, each source data set having a source data set definition describing the data in the source data set;
   receiving at the processor a target data set having data with output field values Vo, each target data set having a target data set definition describing the data in the target data set; said processor comparing each input field value with each output field value, identifying a degree of correspondence between each pair of values, ranking the source and output field values into clusters, and merging the rankings from a data level to a data definition level;
   wherein the step of ranking the source and output field values into clusters comprises:
      identifying, for each output field value Vo, a set No of other output field values within a predetermined distance from Vo;
   identifying a set S of input items Vs related to No;
      identifying, for each item Vs in S, a set Ni of other input field values within a second predetermined distance from Vs;
      ranking at least one of the size, quality of match, and distinctiveness of match of the set Ni compared to No; and
      determining, based upon a predetermined threshold, whether to increase the value of the degree of correspondence between items in Ni to items in No.

2. The inference engine method of claim 1, wherein the step of merging the rankings from a data level to a data definition level comprises:
   examining each target data format definition in No;
   identifying a set Co of correlations directly involving No, any descendants in the data format definition of No, and all mandatory descendants of an ancestor of No;
   examining each source data format definition in Ni that strongly relates to a correlation in Co;
   identifying the set Ci of correlations directly involving Ni, all descendants in the data format definition of Ni, and all mandatory descendants of an ancestor of Ni;
   evaluating the quality of matches between Co and Ci;
   identifying a numerical rating for the correlation; and
   recording the match between Co and Ci as part of an output of the inference engine.

3. The inference engine method of claim 2, wherein the step of examining the target data format definition comprises performing a post-order traversal.

4. The inference engine method of claim 2, wherein the step of examining the source data format definition comprises performing a post-order traversal.

* * * * *